United States Patent [19]

Jabri et al.

[11] Patent Number: 5,640,494
[45] Date of Patent: Jun. 17, 1997

[54] NEURAL NETWORK WITH TRAINING BY PERTURBATION

[75] Inventors: Marwan Anwar Jabri; Barry Glen Flower, both of Sydney, Australia

[73] Assignee: The University of Sydney, Sydney, Australia

[21] Appl. No.: 504,000

[22] Filed: Jul. 19, 1995

Related U.S. Application Data

[63] Continuation of Ser. No. 122,427, filed as PCT/AU92/00133, Mar. 27, 1992, abandoned.

[30] Foreign Application Priority Data

Mar. 28, 1991 [AU] Australia ................................. PK5355

[51] Int. Cl.⁶ ........................................................ G06F 15/18
[52] U.S. Cl. ............................. 395/24; 395/22; 395/23
[58] Field of Search ................................. 395/24, 22, 23

[56] References Cited

U.S. PATENT DOCUMENTS

| | | | |
|---|---|---|---|
| 4,885,757 | 12/1989 | Provence | 395/24 |
| 4,912,647 | 3/1990 | Wood | 395/23 |
| 4,958,939 | 9/1990 | Samad | 395/22 |
| 5,050,095 | 9/1991 | Samad | 395/23 |
| 5,075,868 | 12/1991 | Andes | 395/23 |
| 5,083,285 | 1/1992 | Shima | 395/24 |
| 5,103,496 | 4/1992 | Andes et al. | 395/24 |
| 5,150,450 | 9/1992 | Swenson et al. | 395/24 |
| 5,157,738 | 10/1992 | Carpenter et al. | 395/23 |
| 5,175,797 | 12/1992 | Funabashi et al. | 395/22 |
| 5,255,346 | 10/1993 | Wu et al. | 395/23 |
| 5,293,453 | 3/1994 | Frazier | 395/22 |

FOREIGN PATENT DOCUMENTS

| | | |
|---|---|---|
| 0 385 637 | 9/1990 | European Pat. Off. . |
| 0 432 008 A1 | 6/1991 | European Pat. Off. . |

OTHER PUBLICATIONS

Dembo et al, "Model-Free Distributed Learning", IEEE Trans. on Neural Networks. vol. 1. No. 1. Mar. 1990.

*Primary Examiner*—George B. Davis
*Attorney, Agent, or Firm*—Townsend and Townsend and Crew LLP

[57] ABSTRACT

A neural network comprises an input port connected to an output port by one or more paths, each of which comprises an alternating series of weights and neurons. The weights amplify passing signals by a strength factor. The network can be trained by finding a set of strength factor values for the weights such that the network produces the correct output pattern from a given input pattern. During training, a strength factor perturbating and refresh means applies perturbations to the strength factors of weights in the network, and updates the values of the strength factors depending on the difference between signals appearing at the output port, for a given pair of input and training patterns, when the weight is perturbed, and when it is not.

21 Claims, 2 Drawing Sheets

NEURAL NETWORK WITH TRAINING BY PERTURBATION

This is a Continuation of application Ser. No. 08/122,427, filed as PCT/AU92/00133 Mar. 27, 1992, now abandoned.

TECHNICAL FIELD

This invention concerns a neural network and, in a second aspect, concerns a method of training the neural network.

A neural network can in general be considered to be a type of computer with architecture inspired by the neuron and synapse structure of the brain. Such a computer is capable of being trained to make decisions. For instance, the computer can be trained by "showing" it a series of classified patterns. Once trained the computer will be able when confronted by a pattern to decide which class it belongs to.

Neural networks are made up of neurons connected to each other by synapses. The network may be layered, in which case only the input and output layers are visible to the outside world, and intermediate layers are "hidden".

The function of the synapses (also referred to as weights) is to amplify the signals passing through them, from one neuron to another, by a strength factor.

The function of the neurons is to produce a non-linear (squashed) value of the sum of the amplified signals received from other neurons.

"Training" (also referred to as teaching) a network involves finding a set of strength factor values for the synapses to enable the network to produce the correct output patterns from given input pattern.

BACKGROUND ART

Many researchers have recently proposed architectures for very large scale integration (VLSI) implementation of a type of neural network called a multi-layer perceptron in which the "training" is performed on-chip. A technique known as "back-propagation" has been proposed for use in respect of digital and analogue implementations to train the network.

Back-propagation is a "supervised" training technique. This means than to train a network to recognise an input pattern, the "expected" output of the network associated with the input pattern needs to be known.

Back-propagation trains a network by calculating modifications in the strength factors of individual synapses in order to minimise the value of: half of the sum of the square of the differences between the network output and the "expected" output (the total mean squared error or TMSE). The minimisation process is performed using the gradient of the TMSE with respect to the strength factor being modified (gradient descent). Although the gradient with respect to the strength factors in the output layer (synapses connected to the output neurons) can be easily calculated, the gradient with respect to strength factors in the hidden layers is more difficult to evaluate. Back-propagation offers an analytical technique that basically propagates the error backward through the network from the output in order to evaluate the gradient, and therefore to calculate the required strength factor modifications.

Analog implementation of back propagation requires bi-directional synapses, which are expensive, and the generation of the derivative of neuron transfer functions with respect to their input, which is difficult.

The Madaline Rule III has been suggested as a less expensive alternative to back-propagation for analog implementation. This rule evaluates the required derivatives using "node perturbation". This means that each neuron is perturbated by an amount $\Delta net_i$, which produces a corresponding change in the TMSE. The change in value of the required strength factor $\Delta w_{ij}$ is estimated by the following equation:

$$\Delta w_{ij} = -\eta \frac{\Delta E}{\Delta net_i} x_j$$

where $\Delta E = E_{pert} - E$, i.e., the difference between the mean squared errors produced at the output of the network for a given pair of input and training signals when a node is perturbated ($E_{pert}$) and when it is not (E);

$net_i = \Sigma_j w_{ij} x_j$;

$x_j = f(net_j)$ where f is the non-linear squashing function; and $\eta$ is a constant.

In addition to the hardware needed for the operation of the network, the implementation of the Madaline Rule III training for a neural network having N neurons in analog VLSI requires: an addressing module and wires routed to select and deliver the perturbations to each of the N neurons; multiplication hardware to compute the term $$\frac{\Delta E}{\Delta net_i} x_j$$

N times (if one multiplier is used then additional multiplexing hardware is required); and an addressing module and wires routed to select and read the $x_j$ terms.

If off-chip access to the gradient values is required, then the states of the neurons ($x_j$) need to be made available off-chip as well, and this will require a multiplexing scheme and N chip pads.

DISCLOSURE OF THE INVENTION

According to the present invention, there is provided a neural network of the type including an input port comprising one or more neurons (or neurodes) and an output port comprising one or more neurons.

The neurons of the input port are connected to the neurons of the output port by one or more paths, each of which comprises an alternating series of synapses (weights) and neurons. The weights amplify passing signals by a strength factor. A strength factor perturbating and refresh means applies perturbations to the strength factors of weights in the network, and updates the values of the strength factors depending upon the difference between signals appearing at the output port, for a given pair of input and training patterns, when the weight is perturbated and when it is not.

The output port is preferably connected to a differencing means to provide an error signal, which represents the error produced at the output port, for a given pair of input and training patterns, when the strength factor of a weight is perturbated and when it is not. The output of the differencing means is preferably connected to a multiplier to multiply the error signal by a factor inversely proportional to the perturbation applied to a strength factor of a weight, to produce a signal representing an updated value for the strength factor of that weight. The strength factor perturbating and refresh means preferably updates the values of strength factors of each weight in accordance with the signal representing the update value for that strength factor received from the multiplying means.

Advantageously the neural network further comprises an input gain perturbating and refresh means to apply perturbations to input gains of neurons in the network and to update the value of each input gain depending on the difference between the signals appearing at the output port, for a given pair of input and training patterns, when that input gain is perturbated and when it is Advantageously the neural network further comprises an output gain perturbating and refresh means to apply perturbations to output gains of neurons in the network and no update the value of each output gain depending on the difference between the signals appearing at the output port, for a given pair of input and training patterns, when than output gain is perturbated and when it is not.

During training of the neural network the value of the strength factor of each weight is perturbated, and then updated by an amount depending on the signal representing the update value for that strength factor.

This technique, called 'weight perturbation', relies on its ability to approximate the required derivative, that is the change in the value of each strength factor required to update it, according to the following equation:

$$\Delta w_{ij} = -\eta \frac{\Delta E}{\Delta_{pert} w_{ij}}$$

where $\Delta E$ is $E_{pert}$–$E$, i.e., the difference between the mean squared errors produced at the output of the network for a given pair of input and training patterns when a weight is perturbated ($E_{pert}$) and when it is not ($E$);

$\Delta_{pert} w_{ij}$ is the perturbation applied to the strength factor at weight $w_{ij}$; and $\Delta w_{ij}$ is the update amount for the strength factor of $w_{ij}$.

The gradient with respect to the strength factor may be evaluated by the forward difference approximation:

$$\frac{\partial E}{\partial w_{ij}} = \frac{\Delta E}{\Delta_{pert} w_{ij}} + O(\Delta_{pert} w_{ij}) =$$

$$\frac{E(w_{ij} + pert_{ij}) - E(w_{ij})}{pert_{ij}} + O(\Delta_{pert} w_{ij})$$

If the perturbation $\Delta_{pert} w_{ij}$ is small enough the error term $O(\Delta_{pert} w_{ij})$ may be neglected and the strength factor update amount becomes:

$$\Delta w_{ij} = \frac{E(w_{ij} + pert_{ij}) - E(w_{ij})}{pert_{ij}}$$

where $E()$ is the total mean square error produced at the output of the network for a given pair of input and training patterns and a given set of values for the strength factors of the weights.

The order of the error of the forward difference approximation can be improved by using the central difference method so that:

$$\frac{\partial E}{\partial w_{ij}} = \frac{\Delta E}{\Delta_{pert} w_{ij}} - O(\Delta_{pert} w_{ij}^2) =$$

$$\frac{E\left(w_{ij} + \frac{pert_{ij}}{2}\right) - E\left(w_{ij} - \frac{pert_{ij}}{2}\right)}{pert_{ij}} - O(\Delta_{pert} w_{ij}^2)$$

if the perturbation $\Delta_{pert} w_{ij}$ is again small enough the strength factor update rule becomes:

$$\Delta w_{ij} = \frac{E\left(w_{ij} + \frac{pert_{ij}}{2}\right) - E\left(w_{ij} - \frac{pert_{ij}}{2}\right)}{pert_{ij}}$$

however, the number of forward relaxations of a network of N neurons is of the order $N^3$, rather than $N^2$ for the forward difference method. Thus either method can be selected on the basis of a speed/accuracy trade-off.

Note, that as $\eta$ and $pert_{ij}$ are both constants within a given strength factor, the analog implementation version can simply be written as:

$$\Delta w_{ij} = G(pert_{ij}) \Delta E(w_{ij}, pert_{ij})$$

with $$G(pert_{ij}) = -\frac{\eta}{pert_{ij}}$$

and $$\Delta E(w_{ij}, pert_{ij}) = E(w_{ij} + pert_{ij}) - E(w_{ij})$$

The strength factor update hardware involves only the evaluation of the error with perturbated and unperturbated strength factors and then multiplication by a constant.

This technique is advantageous for analog VLSI implementation for the following reasons:

As the gradient $$\frac{\delta E}{\delta w_{ij}}$$

is approximated by $$\frac{E_{pert} - E}{\Delta_{pert} w_{ij}}$$

(where $\Delta_{pert} w_{ij}$ is the perturbation applied at weight $w_{ij}$), no back-propagation path is needed and only forward paths are required. This means, in terms of analog VLSI implementations, no bidirectional circuits and hardware for the back-propagation are needed. Also, the hardware used for the operation of the network is used for the training. Only single simple circuits to implement the weight update are required. This simplifies the implementation considerably.

Compared to Madaline Rule III, weight perturbation does not require the two neuron addressing modules, routing and extra multiplication.

Weight perturbation does not require any overheads in routing and addressing connections to every neuron to deliver the perturbations, since the same wires used to access the weights are used to deliver weight perturbations. Furthermore, Madaline Rule III requires extra routing to access the output state of each neuron and extra multiplication hardware is needed for the terms, which is not the case with weight perturbation. Finally, with weight perturbation, the approximated gradient values can be made available if needed at a comparatively low cost since, if the mean square error is required off-chip, then only one single extra pad is required. Otherwise, if approximated gradient values are to be calculated off-chip, no extra chip area or pads are required, since the output of the network would be accessible anyway.

In summary, weight perturbation is less expensive to implement in analog VLSI. The hardware cost in terms of VLSI chip area, programming complexity, hardware design time, and as a result the size of the neural network that can be implemented, is less than that required to implement Madaline Rule III.

The weight perturbation technique may also be used to train multi-layer recurrent networks, and many artificial neural network models with feedback, including: multi-layer neural networks; simple recurrent networks like Elman networks; and recurrent networks training to recognise temporal sequences (like Williams and Zipser networks). For all these networks, the hardware implementation of the weight perturbation technique is very similar. The weight perturbation technique can also be applied to fully interconnected multi-layer perceptrons.

BRIEF DESCRIPTION OF THE DRAWINGS

The invention will now be described by way of example only with reference to the accompanying drawings, in which.

(Similar reference numerals have been used throughout both figures to identify corresponding elements.)

BEST MODES FOR CARRYING OUT THE INVENTION

Figure 1:
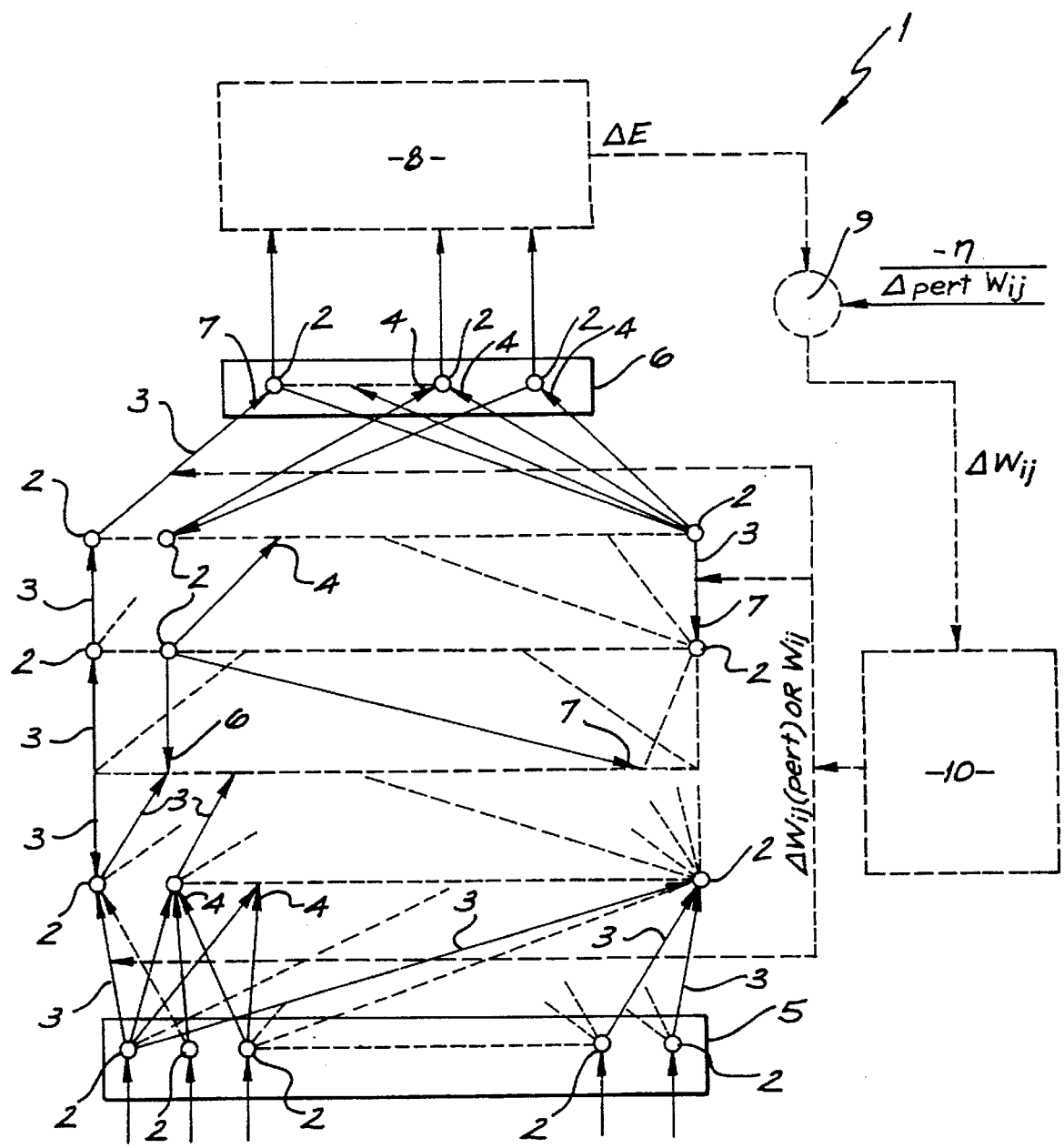
FIG. 1 is a schematic diagram of a neural network embodying the present invention.

Turning now to FIG. 1, neural network 1 comprises an array of neurons, or neurodes, 2 only some of which are shown for the sake of clarity. The neurons 2 are interconnected by synapses, or weights 3, to form an array depending on the desired function. Feed forward arrays have the flow of signals, shown by arrows 4, from the nodes of the input port 5 to the nodes of the output port 6, that is in the upwards direction only. Recurrent networks include reverse flows indicated by arrows 7 directed downwards. The weights are identifiable throughout the array by coordinates x and y, of which i and j are taken to be any particular case.

The neurons at output port 6 are connected to a differencing means 8. Differencing means 8 calculates the difference between the mean squared error produced at the output of the network for a given pair of input and training signals applied at input port 5 when the strength factors of the weights are perturbated $E_{pert}$ and when they are not perturbated E.

The output of differencing means 8, ΔE, is fed to a multiplying means 9 where it is multiplied by a factor proportional to the reciprocal of the perturbation applied to the strength factor at weight $w_{ij}$.

The output of the multiplier is the update rule for the strength factor at that weight, $\Delta w_{ij}$, and this is applied to an input of the weight perturbation and weight refreshing system 10. The output of the weight perturbation and refreshing system 10 alternates between the sum of a perturbation $\Delta_{pert}w_{ij}$ and the strength factors $W_{ij}$, and the updated values for the strength factors $w_{ij}$ alone.

When the strength factors of the weights are perturbated, the error gradient and magnitude are identified by the differencing means 8, and the value of the strength factor of each weight is then refreshed. The strength factors may be updated repeatedly until the error is within preset limits. At this point training is finished and the network is ready for operation.

The application of the technique to a network performing an exclusive-OR function will now be described.

In order to perform exclusive-OR the network must recognise each of the four possible pairs of inputs, and output the correct one of two outputs, as shown in the following table:

| EXCLUSIVE OR (XOR) | |
|---|---|
| INPUTS | OUTPUTS |
| 0     0 | 0 |
| 0     1 | 1 |
| 1     0 | 1 |
| 1     1 | 0 |

The learning procedure may be implemented as shown in the following table:

```
1   for each pattern p do {
2       E = ForwardPass( )
3       ClearDeltaWeights( )
4       for each weight w_ij do {
5           E_pert = applyPerturbate(w_ij)
6           DeltaError = E_pert - E
7           DeltaW[i] [j] = -η *
                DeltaError/Perturbation
                (If batch mode then accumulate)
8           RemovePerturbation(w_ij)
9       }
10      if not batch mode then Update Weights( )
11  }
12  if batch mode then update weights
```

Line 1 above applies the training loop (lines enclosed in the outermost curly brackets) for each pattern that the network is required to recognise.

Line 2 performs a forward pass through the network. This means that the effect of the application of the current input pattern p is propagated through the network. Propagation takes place through all neurodes and synapses whether they are forward connections or recurrent connections (if recurrent connections exist, then a relaxation process is used to relax the network towards a stable state). Following the propagation of the current input pattern, the total mean squared error is computed using the actual output of the network and the expected output. The error is returned in E.

Line 3 clears previous weight modifications.

Line 4 iterates on all the weights the instructions stated in lines 5 to 8.

Line 5 applies a perturbation to the weight currently being considered for modification and repropagates the input pattern the same way as in Line 2 and calculates the perturbated total mean squared error which is returned in $E_{pert}$.

Line 6 calculates the DeltaError, the difference between the perturbated and unperturbated errors.

Line 7 commutes the modification of the weight currently being considered using DeltaError, the strength of the perturbation that has been applied to the weight and the learning rate η. If batch training mode is used, then weight modifications are accumulated to the previous modifications computed for that weight. Otherwise previous modifications are cleared and the current one is stored (this is done by the=assignment).

Line 8 removes the perturbation that has been applied to the current weight and restores its previous value so the next weight can be considered for modification.

Line 9 is the bound of the weight iteration loop.

Line 10 updates the weights of the network according to the compared modifications if batch mode is not being used.

Line 11 is the bound of the iteration of all patterns to be taught to the network.

Line 12 updates the weights according to the computed modifications if batch mode is being used.

As indicated by the procedure above, either batch mode or on-line mode (not batch) can be used. The difference is: in batch mode the strength factors of the weights are updated after their modifications are accumulated over all patterns, whereas in on-line mode the strength factors of the weights are updated after the presentation of each pattern.

Figure 2:
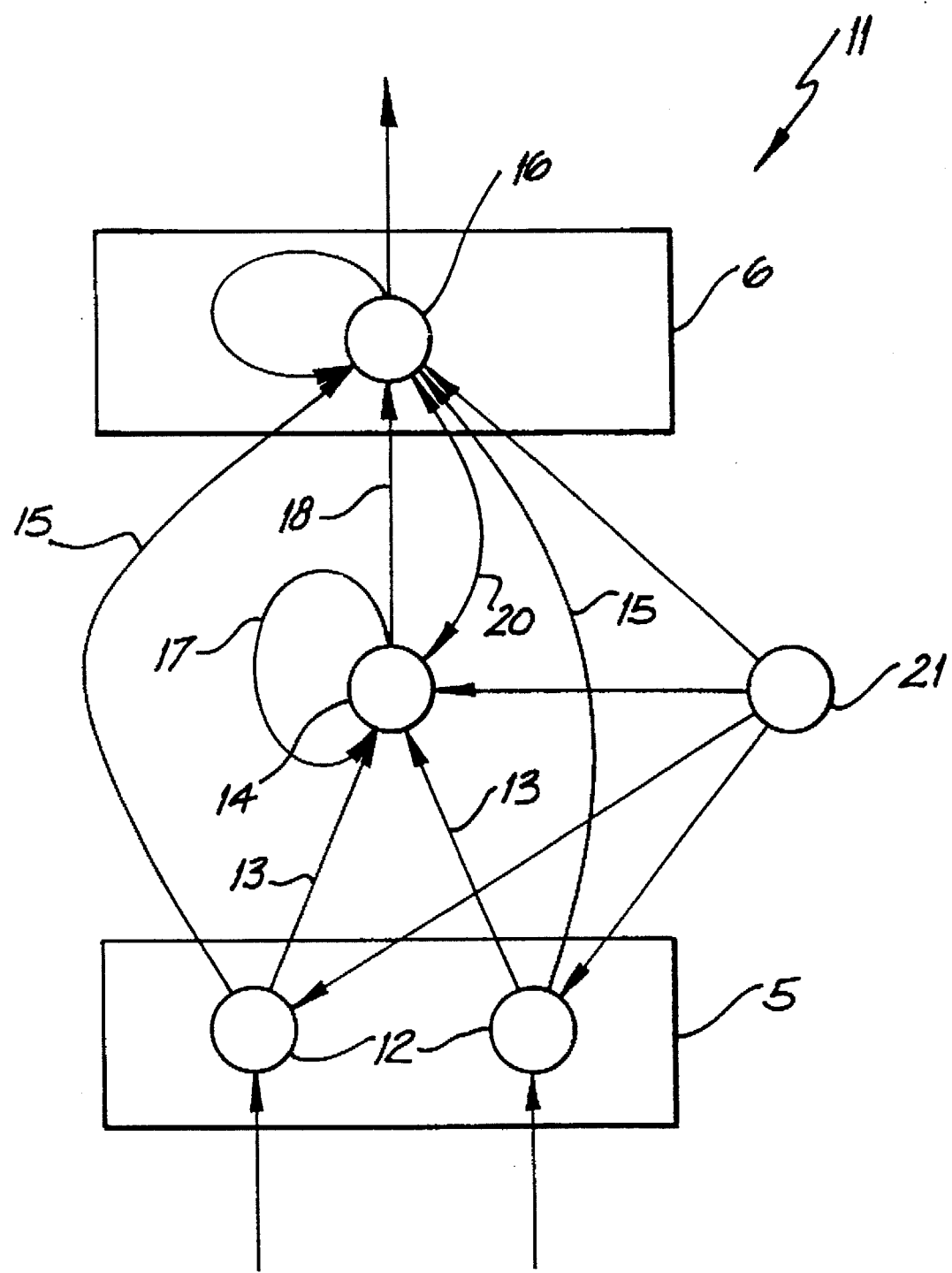
FIG. 2 is a schematic diagram of a multi-layer recurrent exclusive-OR network embodying the present invention.

A recurrent exclusive-OR function 11 network will now be described with reference to FIG. 2. This network has two neurons 12 in the input port 5 connected by respective weights 13 paths to a single intermediate neuron 14. The two neurons 12 are also connected, via weights 15 to a single neuron 16 in the output port 6. The intermediate neuron 14 is connected by a feedback weight 17 to itself and by a feedforward weight 18 to the neuron 16 in the output port. The neuron 16 in the output port is connected by feedback weight 19 to itself and by a feedback weight 20 to the intermediate neuron 14. An offset neuron 21 is connected to each of the other neurons by respective weights. Typical training parameters are given in the following table:

| Parameter | RBP | RWP |
| --- | --- | --- |
| Perturbation strength | NA | 0.001 |
| Neuron relaxation constant | 0.01 | 0.01 |
| Weight relaxation constant | 0.1 | NA |
| Network Stability constant | 0.0000001 | 0.0000001 |
| Learning rate | 0.3 | 0.3 |
| Convergence criteria | 0.1 | 0.1 |
| Initial weight range | 0.7 | 0.7 |
| Sensitivity criteria | 0.3 | 0.3 |

Neurons with programmable gain may also be trained using the weight perturbation method by simply treating the programmable gain as an additional weight in the network. The neuron gain may either be applied to the net input of the neuron or the output of the neuron, and may attenuate or amplify the net input to a neuron, or the output value of a neuron. The advantages of such a feature, are increased learning speed;

weight normalisation;

automatic normalisation of the training set;

the facilitation of pruning as the gain reflects the extent of the participation of a neuron in the network, The node activation function is given by, $$y_i = G_i f_i(g_i \cdot net_i)$$

where $net_i$ is, $$net_i = \sum_j w_{ij} y_i$$

$f_i(\ )$ is the transfer function of node i, $g_i$ is the net input gain of node i and $G_i$ is the output gain of node i.

The gradient with respect to the input gain is $$\frac{\partial E}{\partial g_i} = \frac{E_{\gamma_i(g)} - E}{\gamma_i(g)} + O(\gamma_i(g)) = \frac{\Delta E_{\gamma_i(g)}}{\gamma_i(g)} + O(\gamma_i(g))$$

The approximated gradient is then, $$\frac{\partial E}{\partial g_i} \cong \frac{\Delta E_{\gamma_i(g)}}{\gamma_i(g)}$$

where, $$\Delta E_{\gamma_i(g)} = E_{\gamma_i(g)} - E$$

and $\gamma_i(g)$ is the perturbation applied to the input gain $g_i$, $E_{\gamma_i(g)}$ is the Mean Square Error of the network output with the perturbation applied, E is the Mean Square Error without the perturbation applied. The input gain update rules then become:

$$\Delta g_i = -\eta \frac{\Delta E_{\gamma_i(g)}}{\gamma_i(g)}$$

where η is the learning rate.

The gradient with reference to the output gain is $$\frac{\partial E}{\partial G_i} = \frac{E_{\gamma_i(G)} - E}{\gamma_i(G)} - O(\gamma_i(G)) = \frac{\Delta E_{\gamma_i(G)}}{\gamma_i(G)} + O(\gamma_i(G))$$

The approximated gradient is then, $$\frac{\partial E}{\partial G_i} \cong \frac{\Delta E_{\gamma_i(G)}}{\gamma_i(G)}$$

where, $$\Delta E_{\gamma_i(G)} = E_{\gamma_i(G)} - E$$

and $\gamma_{i(G)}$ is the perturbation applied to the input gain $G_i$, and $E_{\gamma_i(G)}$ is the Mean Square Error of the network output with the perturbation applied, E is the Mean Square Error without the perturbation applied. The gain update rules then become:

$$\Delta G_i = -\eta \frac{\Delta E_{\gamma_i(G)}}{\gamma_i(G)}$$

where η is the learning rate.

Gain Perturbation can then be implemented using an algorithm that is very similar to that for weight perturbation. In fact a direct substitution of gain for weight can be made.

As there is a limit of two gains per node, (one for each of the hem input and output of the node), the computational complexity only increases linearly with the number of nodes in the network. Thus the cost of processing a single training epoch will only increase as the ratio of the number of nodes over the number of interconnections. In a fully interconnected recurrent net this is:

$$C_n = \frac{2}{N}$$

where $C_n$ is the increase in cost of processing the gains, N is the number of nodes.

For a fully connected feedforward network it is:

$$C_n = \frac{2 N_T}{\sum_{L=1}^{L-2} N_j \cdot N_{j+1}}$$

where $N_T$ is the total number of nodes, $N_j$ is the number of nodes in layer j and L is the total number of layers in the network which are numbered (0, 1, 2, ..., L-2, L-1).

The gain perturbation algorithm has been tested on several problems using non-recurrent feed forward networks in combination with weight perturbation and using weight perturbation only, as a control. The results show a fast convergence to the same error threshold using gain perturbation in combination with weight perturbation.

It has been found that the method is insensitive to the size of the gain perturbation factor, but very sensitive to the rate of convergence and the permissible gain range. The convergence rate was 0.3 and the perturbation magnitude was $10^{-5}$ for Weight Perturbation.

| Problem | Error | Weight Perturbation | Weight Perturbation + Gain Perturbation |
|---------|-------|---------------------|----------------------------------------|
| XOR     | 0.04  | 145                 | 55                                     |

The techniques require an input vector and a weight vector to be presented to the network, and an output vector is generated. It is not necessary to know about the internal architecture or activity of the network in order to perform optimisation of the weight space. Access to the synaptic weights, input neurons and output neurons is sufficient. Gain perturbation performs an approximation of the gradient descent algorithms from which it is derived. As such it can solve any problems that can be solved by true gradient descent provided the perturbation signal magnitude is relatively small, with respect to the gain magnitude, and the convergence factor is small. This algorithm is particularly suited for VLSI or other hardware implementations of artificial neural networks due to its minimal hardware requirements.

We claim:

1. A neural network comprising:
   a plurality of neurons, each neuron receiving one or more inputs and providing an output, the output being obtained as a function of the inputs;
   a plurality of weights, each weight of said plurality of weights being coupled to an output of a first neuron of said plurality of neurons and a selected input of a second neuron of said plurality of neurons and having a strength factor, and each weight multiplying the output of the first neuron by the strength factor to obtain a signal for the selected input of the second neuron so that said plurality of weights thereby interconnect said plurality of neurons;
   an input port to the neural network including inputs to a first group of said plurality of neurons;
   an output port of the neural network including outputs of a second group of said plurality of neurons; and
   strength factor optimization means comprising means for 1) inputting a predetermined input pattern to said input port, 2) obtaining from said output port a first output signal responsive to the predetermined input pattern, 3) temporarily applying a predetermined perturbation to the strength factor of one of said plurality of weights and obtaining from said output port a second output signal responsive to the predetermined input pattern while the predetermined perturbation is applied, 4) obtaining a first error signal in accordance with a comparison between said first output signal and an ideal signal representing said predetermined input pattern, 5) obtaining a second error signal in accordance with a comparison between said second output signal and said ideal signal and 6) updating the strength factor of said one of said plurality of weights responsive to a comparison between the first error signal and the second error signal.

2. The neural network of claim 1 wherein said updating means comprises:
   differencing means for providing an output error signal that is a difference between said first error signal and said second error signal.

3. The neural network of claim 2 wherein said updating means further comprises:
   a multiplier coupled to said differencing means that multiplies said output error signal by a factor inversely proportional to the predetermined perturbation to obtain an updated value for the strength factor of said one of said plurality of weights, wherein said updating means updates the strength factor to be the updated value.

4. The neural network of claim 1 wherein said first error signal is obtained in accordance with a square of differences between said first output signal and said ideal output signal.

5. A neural network comprising:
   a plurality of neurons, each neuron having an associated input gain, receiving one or more inputs and providing an output, the output being obtained by applying a function to the inputs multiplied by an input gain;
   a plurality of weights, each weight of said plurality of weights being coupled to an output of a first neuron of said plurality of neurons and a selected input of a second neuron of said plurality of neurons and having a strength factor, and each weight multiplying the output of the first neuron by the strength factor to obtain a signal for the selected input of the second neuron so that said plurality of weights thereby interconnect said plurality of neurons;
   an input port to the neural network including inputs to a first group of said plurality of neurons;
   an output port of the neural network including outputs of a second group of said plurality of neurons; and
   input gain optimization means for 1) inputting a predetermined input pattern to said input port, 2) obtaining from said output port a first output signal responsive to the predetermined input pattern, 3) temporarily applying a predetermined perturbation to the input gain of one of said plurality of neurons and obtaining from said output port a second output signal responsive to the predetermined input pattern while the predetermined perturbation is applied, 4) obtaining a first error signal in accordance with a comparison between said first output signal and an ideal signal representing said predetermined input pattern, 5) obtaining a second error signal in accordance with a comparison between said second output signal and said ideal signal and 6) updating the input gain of said one of said plurality of neurons responsive to a comparison between the first error signal and the second error signal.

6. The neural network of claim 5 wherein said updating means comprises:
   differencing means for providing an output error signal that is a difference between said first error signal and said second error signal.

7. The neural network of claim 6 wherein said updating means further comprises:
   a multiplier coupled to said differencing means that multiplies said output error signal by a factor inversely proportional to the predetermined perturbation to obtain an updated value for the input gain of said one of said plurality of weights, wherein said updating means updates the strength factor to be the updated value.

8. The neural network of claim 5 wherein said first error signal is obtained in accordance with a square of differences between said first output signal and said ideal output signal.

9. A neural network comprising:

a plurality of neurons, each neuron having an associated output gain and receiving one or more inputs and providing an output, the output being obtained as an output gain multiplied by a function of the inputs;

a plurality of weights, each weight of said plurality of weights being coupled to an output of a first neuron of said plurality of neurons and a selected input of a second neuron of said plurality of neurons and having a strength factor, and each weight multiplying the output of the first neuron by the strength factor to obtain a signal for the selected input of the second neuron so that said plurality of weights thereby interconnect said plurality of neurons;

an input port to the neural network including inputs to a first group of said plurality of neurons;

an output port of the neural network including outputs: of a second group of said plurality of neurons; and output gain optimization means for 1) inputting a predetermined input pattern to said input port, 2) obtaining from said output port a first output signal responsive to the predetermined input pattern, 3) temporarily applying a predetermined perturbation to the output gain of one of said plurality of neurons and obtaining from said output port a second output signal responsive to the predetermined input pattern while the predetermined perturbation is applied, and 4) updating the output gain of said one of said plurality of neurons responsive to a comparison between the first error signal and the second error signal.

10. The neural network of claim 9 wherein said updating means comprises:

differencing means for providing an output error signal that is a difference between said first error signal and said second error signal.

11. The neural network of claim 10 wherein said updating means further comprises:

a multiplier coupled to said differencing means that multiplies said output error signal by a factor inversely proportional to the predetermined perturbation to obtain an updated value for the output gain of said one of said plurality of weights, wherein said updating means updates the output gain to be the updated value.

12. The neural network of claim 9 wherein said first error signal is obtained in accordance with a square of differences between said first output signal and said ideal output signal.

13. In a neural network comprising:

a plurality of neurons, each neuron receiving one or more inputs and providing an output, the output being obtained as a function of the inputs;

a plurality of weights, each weight of said plurality of weights being coupled to an output of a first neuron of said plurality of neurons and a selected input of a second neuron of said plurality of neurons and having a strength factor, and each weight multiplying the output of the first neuron by the strength factor to obtain a signal for the selected input of the second neuron so that said plurality of weights thereby interconnect said plurality of neurons;

an input port to the neural network including inputs to a first group of said plurality of neurons; and an output port of the neural network including outputs of a second group of said plurality of neurons, a method for training the neural network comprising the steps of:

(a) inputting a predetermined input pattern to the input port;

(b) obtaining from the output port a first output signal responsive to the predetermined input pattern;

(c) applying a predetermined perturbation to the strength factor of one of said plurality of weights;

(d) obtaining from said output port a second output signal responsive to the predetermined input pattern while the predetermined perturbation is applied;

(e) obtaining a first error signal in accordance with a comparison between said first output signal and an ideal signal representing said predetermined input pattern;

(f) obtaining a second error signal in accordance with a comparison between said second output signal and said ideal signal; and (g) updating the strength factor of said one of said plurality of weights responsive to a comparison between the first error signal and the second error signal.

14. The method of claim 13 wherein said (c), (d), (e), (f), and (g) steps are repeated for each of said plurality of weights.

15. The method of claim 13 wherein said (e) step comprises the of:

obtaining said first error signal in accordance with a sum of a square of differences between the first output signal and an ideal output signal associated with the predetermined input pattern.

16. In a neural network comprising:

a plurality of neurons, each neuron having an associated input gain and receiving a plurality of inputs and providing an output, the output being obtained by applying a function to the plurality of inputs multiplied by an input gain;

a plurality of weights, each weight of said plurality of weights having a strength factor and receiving the output of a first neuron of said plurality of neurons, and each weight multiplying the output of the first neuron by the strength factor to obtain a signal for a selected input of a second neuron of said plurality of neurons so that said plurality of weights thereby interconnect said plurality of neurons;

an input port to the neural network including inputs to a first group of said plurality of neurons; and an output port of the neural network including outputs of a second group of said plurality of neurons, a method for training the neural network comprising the steps of:

(a) inputting a predetermined input pattern to the input port;

(b) obtaining from the output port a first output signal responsive to the predetermined input pattern:

(c) applying a predetermined perturbation to the input gain of one of said plurality of neurons;

(d) obtaining from said output port a second output signal responsive to the predetermined input pattern while the predetermined perturbation is applied;

(e) obtaining a first error signal in accordance with a comparison between said first output signal and an ideal signal representing said predetermined input pattern;

(f) obtaining a second error signal in accordance with a comparison between said second output signal and said ideal signal; and (g) updating the input gain of said one of said plurality of neurons responsive to a comparison between the first error signal and the second error signal.

17. The method of claim 16 wherein said (c), (d), (e), (f), and (g) steps are repeated for each of said plurality of weights.

18. The method of claim 16 wherein said (e) step comprises the of:

obtaining said first error signal in accordance with a sum of a square of differences between the first output signal and an ideal output signal associated with the predetermined input pattern.

19. In a neural network comprising:

a plurality of neurons, each neuron having an associated output gain and receiving one or more inputs and providing an output, the output being an output gain multiplied by a function of the inputs;

a plurality of weights, each weight of said plurality of weights being coupled to an output of a first neuron of said plurality of neurons and a selected input of a second neuron of said plurality of neurons and having a strength factor, each weight multiplying the output of the first neuron by the strength factor to obtain a signal for the selected input of the second neuron so that said plurality of weights thereby interconnect said plurality of neurons;

an input port to the neural network including inputs to a first group of said plurality of neurons; and an output port of the neural network including outputs of a second group of said plurality of neurons, a method for training the neural network comprising the steps of:

(a) inputting a predetermined input pattern to the input port;

(b) obtaining from the output port a first output signal responsive to the predetermined input pattern:

(c) applying a predetermined perturbation to the output gain of one of said plurality of neurons;

(d) obtaining from said output port a second output signal responsive to the predetermined input pattern while the predetermined perturbation is applied;

(e) obtaining a first error signal in accordance with a comparison between said first output signal and an ideal signal representing said predetermined input pattern;

(f) obtaining a second error signal in accordance with a comparison between said second output signal and said ideal signal; and (g) updating the output gain of said one of said plurality of neurons responsive to a comparison between the first error signal and the second error signal.

20. The method of claim 19 wherein said (c), (d), (e), (f), and (g) steps are repeated for each of said plurality of weights.

21. The method of claim 19 wherein said (e) step comprises the of:

obtaining said first error signal in accordance with a sum of a square of differences between the first output signal and an ideal output signal associated with the predetermined input pattern.

* * * * *